United States Patent [19]
Kruse

[11] Patent Number: 5,112,576
[45] Date of Patent: May 12, 1992

[54] CATALYTIC CRACKING UNIT WITH COMBINED CATALYST SEPARATOR AND STRIPPER

[75] Inventor: Larry W. Kruse, Crete, Ill.

[73] Assignee: Amoco Corporation, Chicago, Ill.

[21] Appl. No.: 529,191

[22] Filed: May 25, 1990

[51] Int. Cl.⁵ .............................. B01J 8/18
[52] U.S. Cl. .................... 422/144; 422/147; 422/214
[58] Field of Search ............... 422/144, 145, 147, 207, 422/214, 223, 140, 141, 142, 146; 55/426, 459.1; 208/161, 164

[56] References Cited

U.S. PATENT DOCUMENTS

| | | | |
|---|---|---|---|
| 2,422,501 | 6/1947 | Roetheli | 422/207 |
| 2,903,416 | 9/1959 | Metrailer | 422/144 |
| 3,353,925 | 11/1967 | Baumann et al. | 422/214 |
| 3,785,782 | 1/1974 | Cartmell | 422/147 |
| 4,043,899 | 8/1977 | Anderson | 422/144 |
| 4,414,100 | 11/1983 | Krug | 422/145 |
| 4,692,311 | 9/1987 | Parker et al. | 422/147 |
| 4,695,370 | 9/1987 | Galtier et al. | 422/147 |
| 4,721,603 | 1/1988 | Krug et al. | 422/147 |
| 5,000,841 | 3/1991 | Owen | 422/144 |
| 5,019,354 | 5/1991 | Chan | 422/147 |

*Primary Examiner*—Peter Kratz
*Attorney, Agent, or Firm*—Thomas W. Tolpin; William H. Magidson; Frank J. Sroka

[57] ABSTRACT

A catalytic cracking apparatus is provided for cost-effectively separating and stripping hydrocarbon from catalyst while limiting the occurrence of undesired catalytic overcracking and thermal cracking reactions. The apparatus includes a reactor, a combined gross separator and catalyst stripping vessel, and a disengaging vessel. The combined vessel is positioned to quickly separate catalyst from reactor products, reduce catalytic overcracking and strip volatile hydrocarbon from coked catalyst in one unitary vessel. The disengager is designed to dampen the flow of grossly separated hydrocarbon, substantially separate catalyst fines from the grossly separated hydrocarbon, and convey the catalyst fines to the combined gross separation and catalyst stripping vessel.

18 Claims, 1 Drawing Sheet

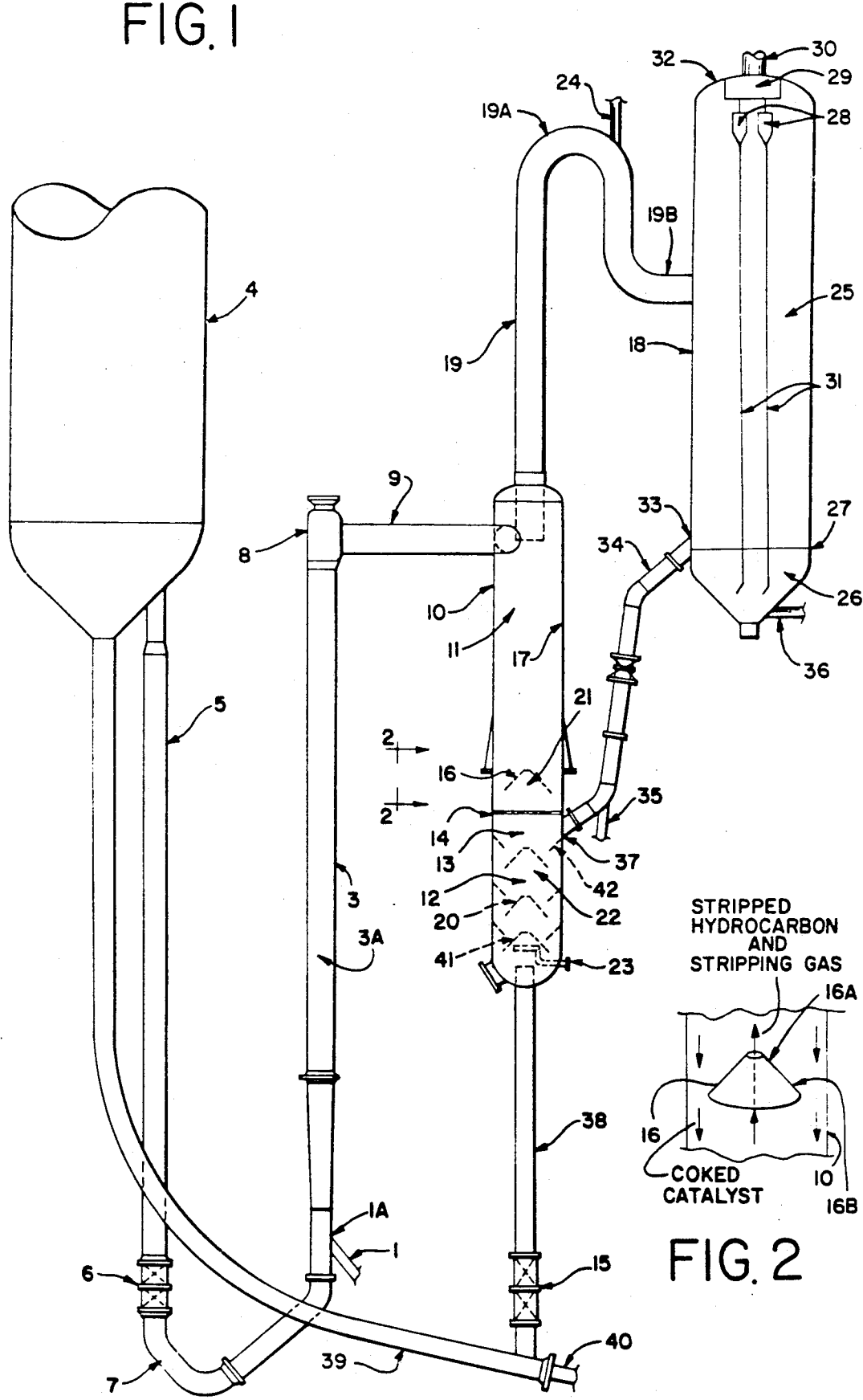

CATALYTIC CRACKING UNIT WITH COMBINED CATALYST SEPARATOR AND STRIPPER

BACKGROUND OF THE INVENTION

1. Field of Invention

This invention relates to an apparatus for the separation of catalyst from hydrocarbon in a fluid catalytic cracking unit (FCU).

2. Background

Gasoline and distillate liquid hydrocarbon fuels are the primary finished products for most petroleum refiners. These fuels boil in the range of about 100° F. to about 650° F. However, the crude oil from which these fuels are derived can often contain from 30 to 70 percent by volume hydrocarbon boiling above 650° F. The process of fluid catalytic cracking breaks apart high boiling point, high molecular weight molecules into lower boiling point, lower molecular weight products that can be blended into gasoline and distillate fuels.

Fluid catalytic cracking units operate through the introduction of a hot fluidized catalytic cracking catalyst into a high molecular weight feed at the upstream end of a riser reactor. Once contacted with the hot catalyst, the feed is vaporized, carrying a suspension of catalyst and hydrocarbon up through the riser reactor. The hot catalyst supplies all or a major portion of the heat necessary to vaporize the hydrocarbon feed and to carry out the endothermic catalytic cracking reaction.

The suspension of catalyst and hydrocarbon vapor passes up the riser reactor at high velocity. However, due to the high activity of the catalyst, the cracking reaction generally proceeds to the desired extent prior to or upon reaching the upper or downstream end of the riser reactor. The cracked hydrocarbon must then be separated from the catalyst and further processed into upgraded products. The catalyst, which has accumulated coke in the cracking reaction, must be stripped to remove extraneous hydrocarbons and regenerated prior to reintroduction into the riser reactor. Apparatus improvements in this separation and stripping stage is the subject of this invention.

Many catalytic cracking advancements have been made in the area of catalyst separation, catalyst stripping, and prevention of undesired catalytic reactions. Some catalytic cracking equipment had bed crackers with sloped risers. The sloped riser performed the function of carrying the oil and catalyst to the catalyst bed where most of the reaction occurred. Slower catalytic reaction times facilitated the operation of bed crackers and were a result of the lower activity catalyst prevalent at the time and lower reaction temperatures. Catalyst separation from hydrocarbon was performed in cyclones erected in the reaction vessel. Quick disengaging of catalyst from hydrocarbon was not as necessary to prevent undesired overcracking reactions due to the lower catalyst activity and reaction temperatures. Catalyst stripping was performed in a stripper section communicating with the catalyst bed.

As crude costs increased, gasoline volume and octane requirements remained strong, and the phase out of lead from gasoline took effect, refiners stepped up cracking catalyst development efforts. High activity catalysts, particularly crystalline zeolite cracking catalysts, were developed, followed by processing techniques and equipment permitting higher reactor temperatures. However, as reaction temperatures and catalyst to oil ratio were increased, it was observed that much of the desired catalytic reaction was occurring in the riser. Refiners began building facilities that were designed to perform the cracking reactions in the riser. The fundamental change in apparatus featured longer, more vertically positioned riser reactors, which resulted in more effective catalyst to oil mixing. The vertical riser facilities reduced undesirable light gas production, increased conversion to light products, increased gasoline octane, and lowered undesirable coke production.

An unexpected penalty associated with higher catalyst activity and higher reactor temperatures was the occurrence of catalytic overcracking and thermal cracking. Unless the catalyst was quickly removed from the hydrocarbon, undesirable overcracking reactions would occur, reducing gasoline yield and increasing light gas production. Older prior art catalytic cracking units were not equipped to mitigate this condition. Newer facilities began to recognize the problems associated with overcracking and thermal cracking and included roughcut cyclone separation erected in close proximity to or communicating with the riser reactor to help reduce the problem.

In some types of catalytic cracking units, the riser penetrates the center of the disengager vessel. These units afford quick separation of catalyst from oil by positioning an inverted can over the riser outlet. The catalyst and hydrocarbon is directed downwards where the catalyst is directed towards a stripping section positioned immediately below the disengaging section of the disengager vessel or to a separate stripper vessel. The hydrocarbon pressures back through the inverted can and is further separated from catalyst in secondary cyclones prior to exiting the disengager. The extended hydrocarbon flow pattern between the inverted can and the secondary cyclones permits undesirable thermal cracking reactions to occur at high reaction temperatures and detracts from the utility of center riser designs.

The center riser facility also can have a completely enclosed internal "hot-wall" roughcut separator and secondary cyclones. Enclosed "hot-wall" roughcut separator designs translate into more costly and time-consuming maintenance. Prior art internal "hot-wall" vessels require more expensive metallurgy, thicker steel, exotic refractory and erosion protection, as well as more costly rigging to assemble the cyclone within another vessel than the external cyclone alternative. Moreover, internal cyclone failures in hot-wall vessels are difficult to visually detect. Repairs are also more difficult to perform, usually requiring unit shutdown as well as long, time-consuming preparation steps prior to and upon entry into the disengager vessel.

Some prior art catalytic cracking units have an external positioned vertical riser with a closely connected external roughcut separator. Such units provide quick separation of catalyst from oil by the close proximity of the roughcut separator to the riser outlet. However, the apparatus is more expensive to build due to additional ductwork and plot space requirements.

Other prior art catalytic cracking units have been employed to address many of the objectives and problems noted above, each with varying degrees of success and limitations.

Anderson et al., U.S. Pat. No. 4,043,899, describes internal cyclones which have been modified to include cyclonic stripping of catalyst separated from hydrocarbon vapors from a center riser catalytic cracking unit.

Parker et al., U.S. Pat. No. 4,455,220, describes a single vessel cyclone separator and stripper assembly having a vortex stabilizer mechanism separating the two vessel sections. The Parker design also has a secondary cyclone connected directly to the single vessel roughcut cyclone outlet without benefit of a disengaging space. While the design features less equipment and can be built for a lower cost, the generically nonuniform flow of riser reactors can pose difficulties for these systems. When the riser outlet flow surges upwards, roughcut separation efficiency is greatly reduced and excessive amounts of hydrocarbon can drop down to the stripper section while excessive amounts of catalyst spew out the top of the cyclone. This continuous cycling results in undesired overcracking in the roughcut cyclone hydrocarbon outlet and the potential for catalyst defeating the secondary cyclone and breaking through to downstream equipment.

SUMMARY OF THE INVENTION

It is an objective of this invention to provide an improved apparatus for reliably separating catalyst from hydrocarbon that capitalizes on the maintenance and reliablity advantages of external separation, reduces thermal cracking, compensates for the nonuniformity in flow from riser-reactors and the adverse effects of flow swings on cyclone performance, and achieves these results at minimum cost and complexity.

It is an additional object of this invention to provide an improved apparatus for thoroughly and reliably stripping volatile hydrocarbon from coked catalyst, that provides adequate disengaging space and stripping gas access, while not requiring excessive facilities.

The present invention achieves the above objectives by providing: a reactor which contacts a hydrocarbon feed with catalytic cracking catalyst at catalytic cracking conditions to produce a suspension of hydrocarbon product and coked catalyst; disengager means including a product inlet and a hydrocarbon gas outlet; and external means positioned outwardly of and communicating with the reactor and the disengager means. The external means include a separator means for grossly separating the coked catalyst from the hydrocarbon product and also include stripper means for substantially removing volatile hydrocarbon from the coked catalyst.

The disengager means desirably comprises a substantially upright disengaging vessel for dampening the swings in flow of roughly separated hydrocarbon and substantially disengaging and separating coked catalyst from the hydrocarbon product. The disengaging vessel desirably contains at least one internal cyclone separator.

Preferably, a hydrocarbon quench injector is provided on the roughcut cyclone hydrocarbon outlet to the disengager vessel. In the preferred embodiment, the quench comprises light catalytic cycle oil and/or a heavy catalytic cycle oil.

In the preferred form, the external means comprises a single unitary vessel having an upper external roughcut cyclone separation section with a roughcut cyclone and a lower catalyst stripping section spaced below the upper cyclone separation section. The upper external roughcut cyclone separation section has a product outlet and a coked catalyst outlet to the catalyst stripping section. The lower catalyst stripping section is positioned to strip volatile hydrocarbon from the coked catalyst from both the external roughcut cyclone separation section and the disengager vessel.

The invention can be configured as an original installation or as a retrofit to an existing fluid catalytic cracking facility.

A more detailed description of the invention is provided in the following specification and claims taken in conjunction with the accompanying drawing.

BRIEF DESCRIPTION OF THE DRAWING

FIG. 1 is a schematic flow diagram of a catalytic cracking unit and process in accordance with principles of the present invention.

FIG. 2 is an enlarged fragmentary perspective view of the frusto conical deflector, taken substantially along line 2—2 of FIG. 1.

DETAILED DESCRIPTION OF THE PREFERRED EMBODIMENTS

The present invention provides an improved catalytic cracking unit apparatus and process for cost-effectively and reliably separating and stripping hydrocarbon from catalyst to achieve a substantially catalyst-free hydrocarbon product while limiting the occurrence of undesired catalytic overcracking and thermal cracking reactions.

The process of catalytic cracking and the present invention in particular begins with a high boiling catalytic cracker feedstock which generally comprises a mixture of distillate range material boiling between 430° F. and 650° F., gas oil range material boiling between 650° F. and 1000° F., and resid range material boiling at greater than 1000° F. The feedstock, also referred to as hydrocarbon feed, high molecular weight feed, and gas oil feed is generally dominated by the gas oil fraction. The hydrocarbon feed line 1 of the Figure connects at point 1A to vertical upright riser reactor 3. The riser reactor comprises a substantially vertical tubular riser reaction zone 3A. The hot regenerated fluidized catalytic cracking catalyst is supplied to the vertical riser reactor 3 from the regenerator 4. Hot catalyst flows from the regenerator 4, through a catalyst feedline or standpipe 5, through two standpipe catalyst slide valves 6, and curved J-Bend 7, prior to entry into the vertical riser reactor 3. The catalyst is generally supplied at temperatures ranging from 1000° F. to 1500° F.

Suitable hydrocarbon cracking catalysts for use in the practice of this invention include those of the amorphous silica-alumina type having an alumina content of about 10 to about 50 weight percent. Catalysts of the silica-magnesia type are also suitable which have a magnesia content of about 20 weight percent. Preferred catalysts include those of the zeolite-type which comprise from about 0.5 to about 50 weight percent and preferably from about 1 to about 30 weight percent of a crystalline aluminosilicate component distributed throughout an amorphous matrix. Zeolite-type cracking catalysts are preferred because of their thermal stability, high catalytic activity and selectivity.

Catalyst addition to the vertical riser reactor is controlled by the two catalyst slide valves 6. If desired, one catalyst slide valve can be used. Catalyst addition through the standpipe slide valve 6 is generally controlled to target a combined catalyst and oil vertical riser reactor outlet 8 temperature. To reach higher reactor temperatures, the ratio of catalyst to oil is generally higher, hydrocarbon conversion is increased, and the potential for undesirable catalytic overcracking and thermal cracking reactions is increased. At lower vertical riser reactor temperature targets, the standpipe slide valves 6 constrict, reducing the catalyst to oil ratio, lowering hydrocarbon conversion, and reducing the potential for undesirable catalytic overcracking and thermal cracking reactions. Conversion for the purpose of this patent application is defined as the percentage, by weight, of feed boiling over 430° F. converted to products below 430° F. and coke.

The vertical riser reactor 3 is where most of the catalytic cracking reaction substantially takes place. Hydrocarbon feed is substantially vaporized upon contact with the hot catalyst and the catalyst and vapor suspension catalytically react as the hydrocarbon stream proceeds up the vertical riser reactor 3 to produce an upgraded catalyst-laden product stream of catalytically cracked hydrocarbon (oil vapors) and coked spent cracking catalyst comprising larger coked cracking catalyst particulates and smaller coked cracking catalyst fines. The catalyst accumulates coke in the process of converting the hydrocarbon to lighter products.

Not all industry fluid catalytic crackers feature vertical riser designs. Some refiners are still using sloped riser bed crackers. Vertical risers are generally preferred by most refiners since vertical risers improve catalyst and hydrocarbon mixing, reduce coke production, and reduce the period of hydrocarbon vaporization increasing reaction time available in the riser for the desired cracking reactions. Vertical risers also result in lower riser wall temperatures which reduces undesired light hydrocarbon gas production and prolongs riser life.

Upon reaching the top 8 of the vertical riser reactor 3, the coked catalyst and vapor suspension passes through a horizontal linkage line 9 to external means comprising an external elongated, upright combined unitary stripper and cyclone vessel 10. The horizontal linkage line 9 length is minimized to reduce the coked catalyst in oil resonance time to substantially eliminate undesired catalytic overcracking and thermal cracking reactions.

The external elongated upright combined unitary vessel 10 includes an upper external roughcut or grosscut separation section 11 providing a gross separation means with a roughcut gross cyclone, also referred to as a grosscut cyclone, in the upper portion of the vessel 10 and a lower coked catalyst stripping section 12 providing stripping means with a stripper in the lower portion of the vessel 10. The roughcut gross cyclone grossly separates the coked catalyst particulates from the catalyst-laden product stream, as well as from recycled volatile hydrocarbon products as explained below, to produce a grossly separated particulate lean stream of hydrocarbon and a grossly enriched stream of coked catalyst particulates. The horizontal linkage line 9 communicates with the roughcut cyclone section 11 tangentially to create swirling action necessary for particulate separation. The stripper removes and strips volatile hydrocarbon from the grossly separated particulate enriched stream of coked catalyst particulates as well as from the disengaged coked catalyst fines, as explained below, by directing the coked catalyst along a convoluted path in the presence of stripping steam, leaving volatile hydrocarbon products and stripped coked catalyst.

Since the external roughcut cyclone section 11 is combined with stripper section 12, it is important that the vortex action of the cyclone does not conflict with the operation of the stripper section. Should the tail of the vortex extend to the coked catalyst dense bed phase 13, coked catalyst could be fluidized back into the external roughcut cyclone section, reducing cyclone efficiency. Extension of the vortex tail could also disrupt the dense bed coked catalyst level 14. This level must remain steady since it is often utilized to control at least one of the two stripper slide valve positions 15.

The unitary vessel 10 provides a dual function external means which is designed to accommodate both separation and stripping functions by proper dimensioning of the vessel itself, the cyclone separator design, and the horizontal linkage line. It is important to provide sufficient distance between the tail of the vortex and the stripper section dense bed level in order to maintain cyclone performance and hold a steady dense bed coked catalyst level 14. The following formula provides the calculation for vortex length and the design parameters available to ensure sufficient space between the vortex tail and the coked catalyst dense bed level.

Vortex Length $= 2.3\ DE(DC^2/(AB))^{\frac{1}{3}}$ where:
DE is the cyclone hydrocarbon outlet diameter
DC is the cyclone diameter
A is the cyclone inlet duct width
B is the cyclone inlet duct height.

An annular frusto conical deflector 16 is provided as an additional barrier between the vortex tail and the coked catalyst dense bed level 14. The annular deflector 16 comprises a tubular frusto conical baffle with an upwardly slanted converging sidewall 16A designed to channel volatile hydrocarbon upwardly through a central opening (hole) from the stripping section 12 and recycle the hydrocarbon back through the center of the cyclone 11. Channeling hydrocarbon concentrically through the cyclone center minimizes disturbance to coked catalyst flowing downward the cyclone inner wall 17. The downwardly diverging flared sidewalls 16B of the annular deflector 16 provide a skirt which is spaced from and cooperates with the cyclone inner wall 17 to form an annular catalyst passageway therebetween for annularly passing and dispersing the catalyst downwardly and outwardly at an angle of inclination ranging from 15 degrees to 75 degrees relative to the vertical axis of the vessel 10 and in a diverging manner into the baffled stripper section 12. The stripped volatile hydrocarbon product is channeled and passed upwardly through the central opening of the deflector 16 in countercurrent flow relationship to the downwardly passing grossly separated annular particulate-enriched stream of coked catalyst particulates, so as to pass and be recycled to the grosscut cyclone in the upper separation section 11 of the vessel 10. The upward stream of hydrocarbon product flows generally along and about the vertical axis of the vessel 10 and is substantially concentric to and annularly surrounded by the downward flow of the grossly separated particulate-enriched stream of coked catalyst particulates along and outwardly of the skirt of the deflector 16.

Some prior art catalytic cracking units have gross cyclone separation sections which are designed to be internal to the disengager vessel. Internal gross cyclone separation sections can be used for quick separation of coked catalyst from the oil upon exiting the riser outlet. The present invention provides for quick coked catalyst separation while not incurring the penalties of an internal separator design.

Internal separator designs translate into more costly and time-consuming maintenance. Internal "hot-wall" vessels require more expensive metallurgy, thicker steel, exotic refractory and erosion protection, as well as more costly rigging to assemble the cyclone within another vessel than the external cyclone alternative. Moreover, internal cyclone failures in hot-wall vessels are difficult to visually detect. Repairs in hot-wall vessels are also more difficult to perform, usually requiring shutdown as well as long, time-consuming preparation steps prior to and upon entry into the disengager vessel.

The stripper section 12 is also contained in the combined unitary vessel 10 comprising the external means. The stripper section 12 is positioned at the bottom portion of the vessel 10 below the upper external roughcut cyclone separation section 11. In the preferred embodiment, the stripper section 12 has an array of internals comprising alternating tiers of conical baffles 20 with the peaks of the conical baffles facing upwards. The baffle design causes the coked catalyst to follow a convoluted flow path increasing contact and countercurrent exposure between the stripping gas and the coked catalyst, effecting a more thorough removal of volatile hydrocarbon product from coked catalyst. The stripping section has an upper dilute phase stripping area 21 located between the annular deflector 16 and the dense bed coked catalyst level 14 and a lower dense bed stripping area 22 located below the dense bed coked catalyst level 14. Stripping gas can be injected by one or more stripping gas injectors 23 at any level within the lower dense bed stripping area 22, although the preferred embodiment features a stripper gas injector 23 located below the bottom conical baffle 41. The preferred stripping gas is steam for best results.

The upper external roughcut cyclone separator hydrocarbon product outlet 19, also referred to as cyclone product outlet and tubular crossover, extends upwardly from the vessel 10, looping back down via an inverted semicircular U-shaped section 19A to a substantially horizontal tubular duct section 19B, prior to entering an upright vertical disengager vessel 18. The inverted semicircular U-shaped loop 19A is provided as a means of accommodating expansion at temperatures that often exceed 1000° F.

Connected to the cyclone product outlet 19 is the quench injector 24 which is provided to inject a cycle oil quench, such as light catalytic cycle oil (LCCO) or heavy catalytic cycle oil (HCCO), into the product stream after gross separation of coked catalyst therefrom so as to reduce the occurrence of thermal cracking reactions in the hydrocarbon product. This is achieved by positioning the quench injection line (injector) 24 at a location on the downward bend of the downstream leg of the inverted U-shaped loop 19A to permit operation at high riser temperatures and higher resultant catalyst to oil ratios while concurrently quenching the cyclone product outlet stream immediately after rough catalyst removal and before substantial undesired thermal cracking reactions can occur.

Hydrocarbon quench is most effective when injected immediately after roughcut catalyst separation since less reaction time is provided for the undesired thermal cracking reactions to occur. In addition, less quench volume is required to perform an equivalent magnitude of quenching when the hot catalyst has been removed first. Excessive quench volume, beyond that necessary to substantially eliminate undesired thermal cracking reactions is energy inefficient and can limit downstream fractionator capacity. A direct enclosed hydrocarbon conduit such as the external roughcut cyclone outlet 19 in the present invention, is the preferred structure for quench injection since this injection point is external, accessible, and substantially contains the entire hydrocarbon product stream immediately after roughcut separation. The preferred conduit 19 can also be cost-effectively retrofitted with quench injectors on stream or on unit shutdown.

The quench itself can include light catalytic cycle oil (LCCO), heavy catalytic cycle oil (HCCO), heavy catalytic naphtha, light coker gas oil, coker still distillates, kerosene, hydrotreated distillate, virgin gas oil, heavy virgin gas oil, decanted oil, resid and water. The quench stream is preferably HCCO and most preferably LCCO for best results.

The upper external roughcut cyclone separator 11 is designed to accommodate a high coked catalyst loading. While the external roughcut cyclone separator 11 substantially removes about 96 to 98 percent of the larger coked catalyst particles, at a size of generally greater than 50 microns, it is not as efficient separating the smaller coked catalyst particles, at a size generally ranging from 20–50 microns, also known as coked catalyst fines, from the cyclone product outlet.

Loss of roughcut cyclone efficiency can also be caused by the generally unsteady, pulsating flow of the riser reactor 3. When the riser reactor 3 intermittently produces surges of hydrocarbon and catalyst, the temporarily higher catalyst loading can result in the breakthrough of coked catalyst particles and more so of smaller catalyst fines into the cyclone product outlet 19 and into the disengaging vessel 18.

The disengager vessel 18 is spaced laterally and apart from the riser 3 and the external unitary vessel 10 and designed to substantially remove the remaining coked catalyst fines from the cyclone outlet product. The disengager vessel 18 itself performs the function of dampening and absorbing the intermittent surges in flow initiated in the riser 3 so as to dampen the flow of the cooler quenched stream of hydrocarbon, creating a steadier flow of hydrocarbon and coked catalyst fines.

The disengager vessel 18 has an upper dilute phase portion, area, or zone 25 and a lower dense phase portion, area, or zone 26 which are separated by the interface of the dense phase zone 27, also known as the disengager catalyst bed level. Inside the disengager vessel 18 are positioned at least one, and in the preferred embodiment, at least two internal cyclone separators 28, also known as internal secondary cyclones to separate the coked cracking catalyst fines from the steadier flow of cooled quenched hydrocarbon to produce an effluent product catalyst lean stream of upgraded hydrocarbon and a concentrated stream of disengaged coked catalyst fines. The secondary cyclones 28 can be in series or in parallel as pictured in the Figure. A parallel secondary cyclone configuration comprises splitting the steady flow of cooler quenched hydrocarbon into at least two streams, independently cyclone-separating at least two of the streams, and recombining the streams to produce the effluent product catalyst lean stream of upgraded hydrocarbon. The secondary cyclones are positioned in the upper dilute phase 25 where the hydrocarbon outlets of the secondary cyclones are connected to a plenum 29, which is secured to the roof 32 or top of the disengager vessel 18. The plenum 29 is connected to the outlet or disengaged product exit of the disengager 30, discharging the effluent product, comprising a catalyst fine-lean stream or substantially catalyst-free upgraded product stream of hydrocarbon, out of the disengager vessel for further processing. The bottom of the secondary cyclones 28 are connected to catalyst diplegs 31, which transport separated catalyst fines into the lower dense phase zone 26.

The disengager vessel 18 also includes a disengaged catalyst outlet 33 to discharge a concentrated stream of disengaged coked catalyst fines to a catalyst conduit 34 comprising a catalyst recycle line for conveying and passing the catalyst fines to the external means stripping section dense bed phase 13 in the bottom portion of the vessel. In the preferred embodiment, the disengaged catalyst outlet 33 operates as a catalyst overflow line such that the level of the interface of the dense phase zone 27 is determined by the elevation of the catalyst outlet 33 adjusted for hydraulic considerations between the stripper section 13 of the external means and the disengager catalyst outlet 33. The level of the interface of the dense phase zone can also be controlled by a control valve on the catalyst conduit 34 along with the appropriate level control instrumentation.

It is the preferred embodiment of this invention to provide a first supplemental stripping steam injector 35 on the catalyst recycle line 34. It is also a preferred embodiment to provide a second supplemental steam injector 36 into the disengager lower dense phase zone 27. The supplemental stripping steam injectors can be used to reduce hydrocarbon carryover to the regenerator 4 as well as for catalyst fluidization. The total stripping steam provided through injector 23 and supplemental injectors 35 and 36 will generally be in a range of 1 to 15 pounds of steam per ton of catalyst circulated. Additional steam injection would be inefficient; reduced steam usage may result in excessive hydrocarbon breakthrough to the regenerator 4.

The entry position of the catalyst conduit 34 on the stripper section 12 in the preferred embodiment 37 is in the stripper section dense bed phase 13 above the topmost baffle 42. The entry position should be kept below the dense bed coked catalyst level 14. Entry above the dense bed coked catalyst level 14 could create catalyst level disturbances that can disrupt roughcut separator efficiency and stripper slide valve 15 operation. Entry above the topmost baffle 42 can beneficially subject the catalyst fines to additional stripping gas exposure which can reduce hydrocarbon carryover to the regenerator 4. In some circumstances, it may be desirable to adjust the entry position to a lower location on the stripper section 12 or into the stripper outlet line 38.

An advantage of the disengager 18 and secondary cyclone 28 tandem is that the tandem ensures effective particulate removal from hydrocarbon product under extraordinary stripping conditions. Should a special need exist to substantially increase catalyst stripping, such as a regenerator temperature excursion, stripping steam may be increased to the first 35 and second 36 supplemental stripping steam injectors with substantially no detrimental effect. Additional stripping steam may be added to a third location in the combined unitary vessel stripping section, if desired, since the disengager and secondary cyclone tandem can recover coked catalyst that is not recovered in the roughcut cyclone.

The stripper outlet line 38 conveys stripped coked catalyst through the two stripper slide valves 15 for return to the regenerator vessel 4. The preferred embodiment includes two slide valves 15, although in some circumstances only one slide valve need be used. The stripper slide valves 15 are often controlled to maintain the dense bed coked catalyst level 14. The coked catalyst is dropped into the catalyst return line 39 for conveying back to the regenerator vessel 4. The coked catalyst is carried back to the regenerator 4 with a carrier gas injected through carrier line 40. The carrier stream in the preferred embodiment is compressed, air but other gases may be utilized, including steam.

The coked catalyst is conveyed back to the regenerator vessel 4 where the catalyst is contacted with an oxygen-containing gas stream, preferably air, containing an amount of molecular oxygen in excess of that necessary for substantially complete combusion of the coke accumulated on the catalyst in the cracking reaction and for substantially complete combustion of carbon monoxide to carbon dioxide. The regenerator 4 operates at a temperature in the range of 1000° F. to 1500° F., providing the hot catalyst supplied to the standpipe 5 and completing the process cycle.

Other embodiments of the invention will be apparent to those skilled in the art from a consideration of this specification or from practice of the invention disclosed herein. It is intended that this specification be considered as exemplary only with the true scope and spirit of the invention being indicated by the following claims.

What is claimed is:

1. An apoparatus for the catalytic cracking of a hydrocarbon feed, comprising:
   a. a reactor comprising a reactor outlet for contacting a hydrocarbon feed with catalytic cracking catalyst at catalytic cracking conditions and producing a suspension of hydrocarbon product and coked catalyst;
   b. a disengager vessel defining an interior, a product inlet and a hydrocarbon gas outlet and containing and enclosing at least one internal cyclone positioned in the interior of said disengager vessel; and
   c. external means positioned external to, outwardly of, and in comuunication with said reactor and said disengager vessel, said external means located downstream of said reactor outlet and upstream of said disengager product inlet and comprising and substantially enclosing separator means for grossly separating a substantial amount of said coked catalyst from hydrocarbon product, stripping means for removing a substantial amount of volatile hydrocarbon from said coked catalyst, and an annular frusto conical deflector positioned between said separator means and said stripping means, said annular frusto conical deflector defining a central opening, an upwardly converging top, and a downwardly diverging bottom.

2. The apparatus of claim 1 wherein said reactor is a generally upright riser reactor.

3. The apparatus of claim 1 wherein said separator means is interconnected to and positioned above said stripping means.

4. The apparatus of claim 1 wherein said catalyst stripping means comprises stripper internals to increase hydrocarbon stripping efficiency.

5. The apparatus of claim 1 wherein said stripping means comprises stripping steam injection means.

6. The apparatus of claim 1 wherein said disengager vessel comprises a vessel outer wall defining a catalyst outlet and said apparatus includes a catalyst recycle line communicating with and extending between said catalyst outlet of said outer wall of said disengager vessel and said stripper means of said external means.

7. An apparatus for the catalytic cracking of a hydrocarbon feed, comprising:

a. a generally upright riser reactor for contacting a hydrocarbon feed with catalytic cracking catalyst at catalytic cracking conditions and producing a suspension of hydrocarbon product and substantially coked catalyst including larger coked catalyst particulates and smaller coked catalyst fines, said generally upright riser reactor comprising a riser outlet;

b. a substantially upright disengaging vessel for substantially disengaging and separating said catalyst fines from said hydrocarbon product, said disengaging vessel containing at least one internal cyclone, and said disengaging vessel defining a product inlet and a disengaged product outlet; and c. an external combined unitary vessel positioned between, spaced outwardly of, and communicating with said upright reactor and said disengaging vessel, said external vessel located downstream of said riser outlet and upstream of said disengager product inlet and said external combined unitary vessel having a substantially cylindrical upright wall, separator means within said external combined unitary vessel and peripherally surrounded by said upright wall for roughly separating a substantial amount of said coked catalyst from said hydrocarbon product, stripping means positioned below said separator means within said external combined unitary vessel for removing a substantial amount of volatile hydrocarbon from said coked catalyst, and an annular frusto conical deflector positioned between said separator means and said stripping means, said annular frusto conical deflector defining a central upright opening for upward flow of stripped hydrocarbon and stripping gas from said stripping means to said separator means, said annular frusto conical deflector having an upwardly converging top and a downwardly diverging bottom, and said annular frusto conical deflector being spaced inwardly from and cooperating with said upright wall to define an annular catalyst passageway therebetween for downward flow of stripped catalyst.

8. The apparatus of claim 7 wherein said external combined unitary vessel comprising said separator means defines a tangential inlet.

9. The apparatus of claim 7 wherein said catalyst stripping means comprises a plurality of stripper baffles to increase hydrocarbon stripping efficiency.

10. The apparatus of claim 7 wherein said catalyst stripping means coprises at least one stripping gas inlet line.

11. The apparatus of claim 7 wherein said disengaging vessel further comprises a catalyst outlet communicating with said stripping means of said external combined unitary vessel.

12. An apparatus for the catalytic cracking of a hydrocarbon feed, comprising:

a. a substantially vertical, tubular riser reactor having an upstream end and a downstream end;

b. at least one hydrocarbon feed line for feeding hydrocarbon feed into said upstream end of said riser reactor;

c. at least one regenerated cracking catalyst feed line for feeding catalyst into said upstream end of said riser reactor;

d. an external elongated upright combined unitary vessel located externally and outside of said riser reactor, said unitary vessel comprising an upper external roughcut cyclone separation section with a roughcut cyclone, a lower catalyst stripping section spaced below said upper cyclone separation section, a substantially cylindrical upright vessel inner wall, a substantially horizontal linkage line connecting said external roughcut cyclone separation section with said downstream end of said riser reactor, said upper external roughcut cyclone section defining a product outlet and a coked catalyst outlet to said catalyst stripping section;

e. a substantially upright disengager located downstream and spaced laterally from said external unitary vessel, said disengager having an upper dilute phase section, a lower dense phase section, an interface where said upper dilute phase section communicates with said lower dense phase section, a disengager vessel outer wall defining an upper dilute phase section product inlet and defining a disengaged catalyst outlet located substantially at said interface, a tubular crossover connecting said disengager vessel outer wall defining an upper dilute phase section product inlet to said upper roughcut cyclone section defining a product outlet, a roof comprising a top defining a disengaged product exit, at least one internal cyclone separator positioned in said upper dilute phase section, said internal cyclone having a dipleg extending downwardly into said lower dense phase section for discharging separated catalyst into said lower dense phase section and said internal cyclone having an effluent product outlet conduit in said upper dilute phase section communicating with said product exit;

f. said catalyst stripping section having an upper dilute phase stripping area and a lower dense bed stripping area;

g. a catalyst conduit providing a catalyst recycle line communicating between said disengager vessel outer wall defining a disengaged catalyst outlet and said catalyst stripping section lower dense bed stripping area;

h. said catalyst stripping section including an array of internals comprising alternating tiers of baffles including substantially conical baffles, each of said conical baffles having an apex pointing substantially upwards towards said external roughcut cyclone separator, said catalyst stripping section including an annular frusto conical deflector spaced above said baffles, said annular deflector having a downwardly diverging outer wall providing a central opening for channeling stripped hydrocarbon gas through said roughcut cyclone section, said skirt being spaced from and cooperating with said external elongated upright combined unitary vessel inner wall to provide an annular catalyst passageway therebetween for deflecting coked catalyst towards said inner wall of said vessel into said catalyst stripping section; and i. a stripping gas injector connected to said catalyst stripping section for injecting a stripping gas into said catalyst stripping section to substantially strip and remove hydrocarbons from said coked catalyst.

13. The apparatus of claim 12 wherein said disengager contains at least two cyclone separators positioned in the upper dilute phase zone.

14. The apparatus of claim 12 wherein said tubular crossover of said substantially upright disengager comprises a substantially horizontal tubular duct section and an upwardly curved semicircular expansion loop section extending between and connected to said horizontal tubular duct section and said product outlet of said external vessel.

15. The apparatus of claim 14 including a level control valve, positioned on said conduit to control the level of said dense bed zone of said disengager.

16. The apparatus of claim 12 including a level control valve, positioned on said conduit to control the level of said dense bed zone of said disengager.

17. The apparatus of claim 12 including a stripping steam injector connected to said catalyst conduit.

18. The apparatus of claim 12 including a stripping steam injector connected to said disengager.

* * * * *